May 26, 1970     A. VAN DOP ET AL     3,514,507
METHOD FOR PRODUCING MOLDED ARTICLES FROM FOAMED COMPOSITIONS
Filed June 13, 1967     2 Sheets-Sheet 1

INVENTORS
ADRIANUS VAN DOP, DECEASED
BY WILHELMINA CORNELIA VAN DOP,
PERSONAL REPRESENTATIVE,
MARINUS J. DE VROOME

BY: *Norris E. Faringer*

THEIR ATTORNEY

May 26, 1970      A. VAN DOP ET AL      3,514,507

METHOD FOR PRODUCING MOLDED ARTICLES FROM FOAMED COMPOSITIONS

Filed June 13, 1967      2 Sheets-Sheet 2

INVENTORS
ADRIANUS VAN DOP, DECEASED
BY WILHELMINA CORNELIA VAN DOP,
PERSONAL REPRESENTATIVE,
MARINUS J. DE VROOME

BY: *Norris E. Foringer*

THEIR ATTORNEY

United States Patent Office 3,514,507
Patented May 26, 1970

3,514,507
METHOD FOR PRODUCING MOLDED ARTICLES FROM FOAMED COMPOSITIONS
Adrianus van Dop, deceased, late of Rotterdam, Netherlands, by Wilhelmina Cornelia van Dop, personal representative, Rotterdam, Netherlands, and Marinus J. de Vroome, Rotterdam, Netherlands, assignors to Shell Oil Company, New York, N.Y., a corporation of Delaware
Filed June 13, 1967, Ser. No. 647,887
Claims priority, application Netherlands, June 15, 1966, 6608262
Int. Cl. B29d 27/04
U.S. Cl. 264—45                4 Claims

ABSTRACT OF THE DISCLOSURE

Foamed polyurethane insulation jackets are semi-continuously produced in a open-ended mold wherein foamed polyurethane plugs are inserted into the ends of the opened mold prior to the introduction of the polyurethane reactants. After the polyurethane is foamed, wherein the polyurethane merges with the plugs, the mold is opened and the foamed article advanced so that the rearward end functions as one of the plugs. This procedure is repeated as often as desired to obtain a preselected length.

BACKGROUND OF THE INVENTION

This invention relates to a method of producing molded articles from foamed plastic or resinous compositions particularly polyurethane.

Articles from foamed polyurethane can be molded in a mold which completely encloses the articles to be molded, or in a mold which is only open at the top. Once the article in the mold has hardened sufficiently it is lifted out of the mold. A method of this type is not very suitable for the continuous production of a large series of articles. For instance, it is difficult to lay films to prevent the polyurethane from sticking to the mold against the inside wall of the mold, and films of this kind which are normally fed in as flat film strips often have to be folded in the mold, for example, in the corners thereof, in order to permit the film to be laid flat against the entire inside wall of the mold. Not only is this insertion of the films difficult and time-consuming but the folded sections of the films also disturb the smooth exterior of the article formed. In addition, it is often difficult to remove the article, which is enclosed on many sides by the mold, from the mold, while the direction in which the article can be removed from the mold is usually not the most satisfactory for a continuous process.

These advantages are obviated by the instant method in which an open-ended mold is employed wherein said open ends are closed with polyurethane plugs. In this manner, foamed articles can be produced which are several times longer than the foaming mold.

SUMMARY OF THE INVENTION

The instant invention provides a method of producing molded articles from foamed polyurethane wherein the mold has open ends and which before the actual molding operation are sealed off with plugs of foamed polyurethane.

The method of the instant invention provides an easy and efficient method for fabricating, on a semi-continuous basis, articles having a uniform cross-section, such as plates, panels or cylindrical pipe jackets.

Briefly, an otherwise closed mold having its ends open is employed. These open ends are sealed off with plugs of foamed polyurethane. After plugging the ends, polyurethane reactants are introduced into the mold. The mold is then closed and the foamed polyurethane allowed to fill the mold. The foamed polyurethane merges with the plugs and forms a unitary article. The mold is then opened and the foamed article advanced forward until its rearward end plugs the forward end of the mold. The rearward end of the mold is sealed with a polyurethane plug and the molding operation is repeated.

The polyurethane formulations form no part of the instant method and any polyurethane composition capable of being foamed in a mold is suitable.

In general, polyurethane foams are prepared by reacting an organic polyisocyanate or polyisothiocyanate with an organic compound containing in the molecule a plurality of active hydrogen atoms (as determined by the Zereivitinoff method, J.A.C.S., vol 49, page 3181, 1929), such as, for example, an organic polyhydroxy compound.

Suitable polyisocyanates and polyisothiocyanates have the general formula $R(NCX)_{n+1}$, wherein R represents an organic radical, X represents an oxygen atom or a sulfur atom and $n$ is a positive integer.

Suitable polyisocyanates are those compounds which have on the average more than one isocyanato group per molecule, such as those polyisocyanates which can be obtained by the reaction of polyamines with phosgene, such as, for example, toluene diisocyanate, hexamethylene diisocyanate, diphenylmethane diisocyanate, triphenylmethane triisocyanate, naphthalene diisocyanate, meta-phenylene diisocyanate, diphenyl diisocyanate, diphenyl ether diisocyanate, dianisidine diisocyanate, ethylene diisocyanate and diethyl ether diisocyanate. Polyisocyanates of these types may be applied separately or as mixtures, as for example, mixtures of isomers, such as the mixtures of the isomers 2,4-toluene diisocyanate and 2,6-toluene diisocyanate.

Use can also be made of non-volatile polyisocyanates which have been obtained by reaction of polyhydric alcohols, such as ethylene glycol, glycerol and 1,2,6-hexane triol, with an excess of polyisocyanates of the above-mentioned type. An example of such a non-volatile polyisocyanate is the addition product of 1 mole of trimethylolpropane with 3 moles of toluene diisocyanate.

Preferred organic compounds containing active hydrogen atoms include the organic compounds containing terminal hydroxyl groups such as, for example, the polyoxyalkylene polyols prepared from one or more alkylene oxides, i.e., ethylene oxide, propylene oxide, epichlorohydrin. A useful polyoxyalkylene polyol is an alkylene oxide/alkylene polyol adduct that has been reacted with an alkylene oxide as, for example, described in copending U.S. application, Ser. No. 142,011, now Pat. No. 3,336,-242, filed Oct. 2, 1961; for example, a propylene oxide/glycerol adduct that has been reacted with less than 10% by weight of ethylene oxide, preferably 3 to 8% by weight of ethylene oxide. The polyoxyalkylene polyols are preferably produced according to the processes disclosed in British Pats. Nos. 785,229; 785,053; 793,065; and 799,-955, among others. Suitable polyoxyalkylene polyols have an average molecular weight between 300 to 6,000; for example, about 500 to about 3,000.

Other suitable polyisocyanates and organic compounds containing active hydrogen atoms are described in U.S. 3,222,303, U.S. 3,2238,273 and U.S. 3,244,673. Suitable foaming processes are also described in these patents.

Additives, such as light and heat stabilizers, catalysts, fillers, pigments, cell-size regulators, foaming agents, solvents, viscosity controllers, surface-active agents (silicone oils) and the like may be used as desired. The usual additives are described in the above-mentioned patents.

Although the present invention is particularly suitable for use in preparing foamed polyurethane compositions, any other foamed resins and/or plastic compositions may be employed, including, but not limited to, foamed polyepoxides, polyesters, polyethers, polycarbonates, polystyrene, polyolefins, and the like, as well as mixtures thereof. All these polymer compositions are well-known in the art and suitable foamed formulations can be readily obtained from text books, journal articles and patents.

The object of the invention is to provide a method for molding articles from foamed polyurethane, which method is characterized by using a mold which has open ends and which before the molding operation, are sealed off with plugs of foamed polyurethane.

The method is particularly suitable for the continuous production of articles having a uniform cross-section, such as plates, panels or cylindrical pipe jackets. One important application is the production of pipeline insulation jackets, and the invention will therefore be thus further described with reference to the attached drawing.

BRIEF DESCRIPTION OF THE DRAWING

The invention, as it relates more particularly to the production of pipe insulation jackets, is described in greater detail and the best mode presently contemplated in carrying out the present invention is illustrated in the attached drawings wherein.

DESCRIPTION OF THE PREFERRED EMBODIMENTS

The present method is particularly suitable for producing foamed insulation jackets from foamed polyurethanes, and the present method will be described in greater detail as illustrative of the invention.

Figure 1:
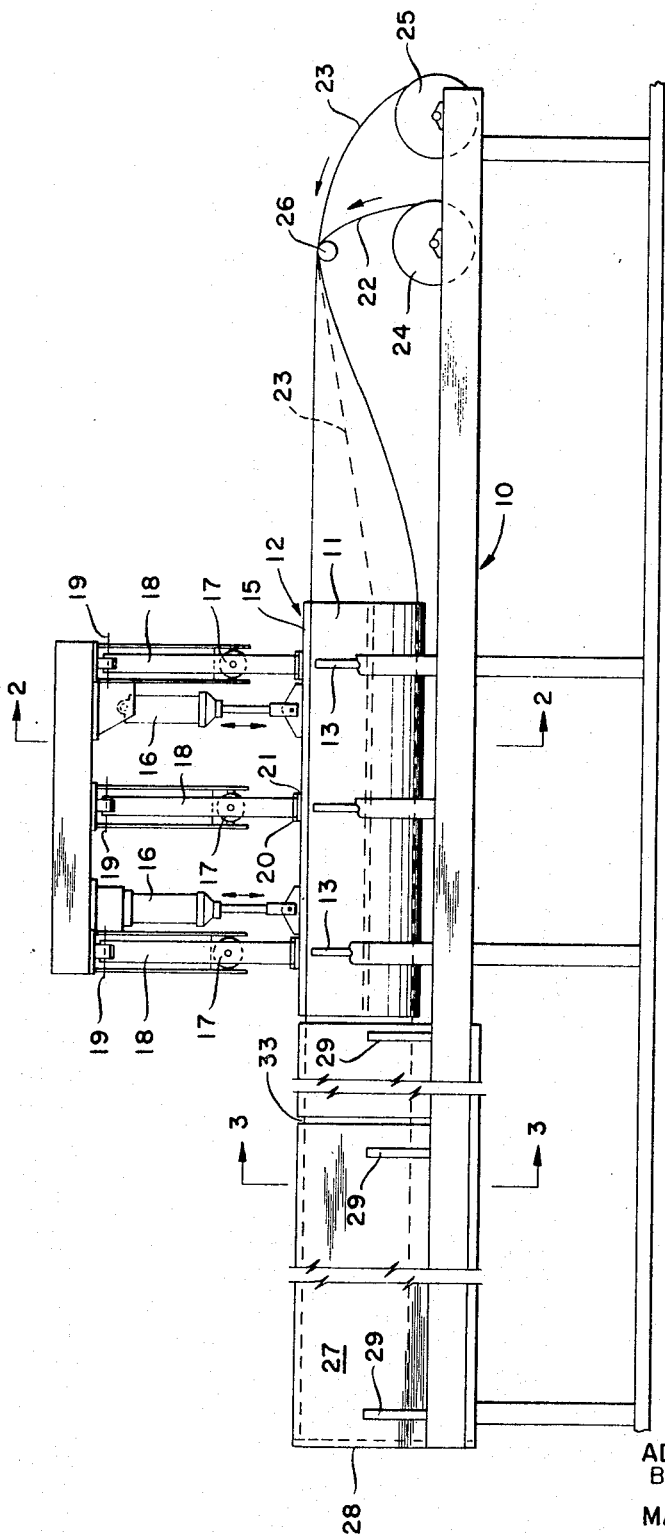
FIG. 1 is a side view of the apparatus for the production of insulation pipe jackets according to the method of the invention.
Figure 2:
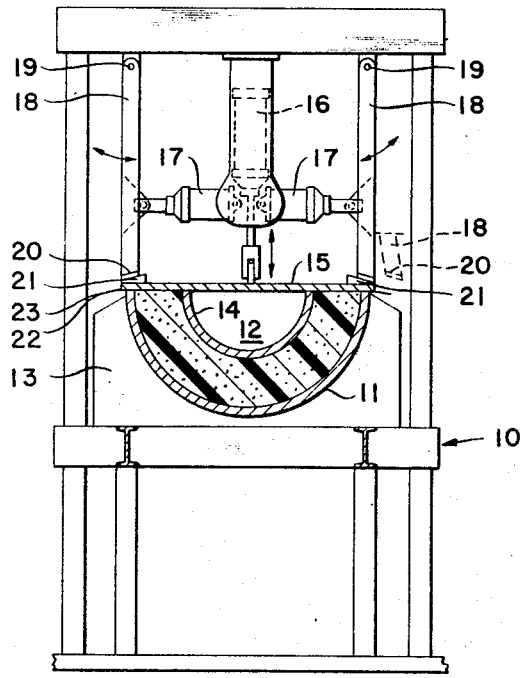
FIG. 2 is a cross-sectional view on the line 2—2 of FIG. 1.
Figure 3:
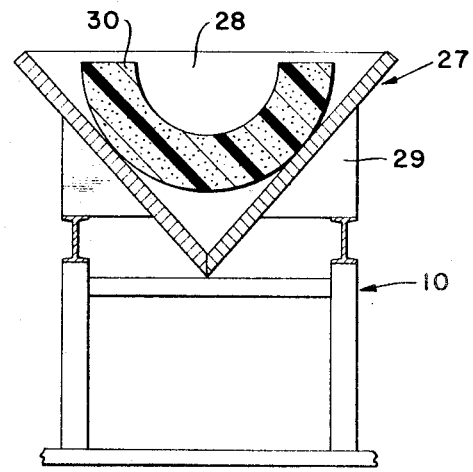
FIG. 3 is a cross-sectional view on the line 3—3 of FIG. 1.

Accordingly, reference is made to FIG. 1 wherein the apparatus comprises a frame 10 on which rests a casting mold for molding the insulation pipe jackets. The casting mold comprises a lower mold half 11 which consists of one of the parts of a pipe sawn through in the longitudinal direction, and which is fixedly secured to the frame 10 by means of supporting plates 13. The casting mold also comprises an upper mold half 12, which is composed of a section 14 of a pipe sawn through in the longitudinal direction and having a smaller diameter than the lower mold half 11, and a cover plate 15 secured to the top of the pipe section 14. In the closed position of the mold 11, 12, as shown in FIG. 2, the cover plate 15 lies against the upper edge of the lower mold half 11, so that the space between the lower mold half 11 and the upper mold half 12 forms the casting or molding cavity for the insulation pipe jackets. Two pneumatically operated cylinders 16 are arranged in the frame 10, the mobile pistons of which cylinders are hingeably connected to the cover plate 15 of the upper mold half 12. One of the two air cylinders 16 (on the right in FIG. 1) is hingeably secured to the frame 10, the barrel of the other air cylinder 16 being fixedly secured to the frame 10. By operation of the cylinders 16, the pistons in these cylinders can be moved vertically up and down, so that the upper mold half 12 is raised from the lower mold half 11 or is moved towards the lower mold half 11 in order respectively to open or close the casting mold. In addition to the vertical air cylinders 16, a number of horizontally arranged air cylinders 17, three sets in the drawing, are also installed in the frame 10. The barrel of each of the horizontal air cylinders 17 is hingeably secured to components of the frame 10. The horizontally movable pistons of the cylinders 17 are each hingeably connected to a pressure arm 18. The pressure arms 18, which are suspended at their upper ends round a horizontal shaft 19 so that they can rotate in the frame 10, serve to counteract the great compressive forces which develop in the casting mold during foaming of the polyurethane mixture, so that the casting mold remains closed. The lower end of each pressure arm 18 is provided with a base 20, which slopes upwards and inwards. When the cylinders 17 are operated the pistons of these cylinders are moved horizontally backwards or forwards so that the arms 18 turn around the shafts 19. When the pistons in the cylinders 17 are moved outwards the arms 18 turn freely outwards, but when the arms 18 are drawn inwards by the pistons in the cylinders 17, the sloping bases 20 of the arms 18 are pressed against small pressure blocks 21, which likewise slope upwardly and inwardly, and which are secured rigidly to the cover plate 15 of the upper mold half 12. When the arms 18 turn inwardly the bases thereof are pressed against the blocks 21, so that the cover plate 15 is pressed downwardly against the upper edge of the lower mold half 11.

A pair of rolls 24, 25 carrying polyethylene film are arranged one behind the other at some distance in front of the casting mold 11, 12 (i.e., at the righthand side of the casting mold in FIG. 1). The purpose of the films is to prevent the polyurethane from adhering to the mold. The films also give the article a smooth surface once they have been removed from the article. The film 22 from roll 24 is used to cover the inside wall of the lower mold half 11, the width of this lower film 22 is so selected that this film 22 can cover the entire inner circumference of the lower mold half 11 and yet still project laterally to some extent over the two upper edges of the lower mold half 11. The film 22 passes from the supply roll 24 over a guide roll 26 and from this guide roll 26 gradually assumes a cylindrically curved form corresponding to the shape of the lower mold half 11. The film 23 from the real roll 25 is used to cover the inside wall of the upper mold half 12; the film 23 likewise passes over the guide roll 26 on top of the film 22, and between the guide roll 26 and the upper mold half 12 gradually takes on the shape of the inside wall of the latter. The inside wall of the upper mold half 12 is formed by the underside of the pipe section 14 and by the underside of the portions of the cover plate 15, which protrude on both sides of the pipe section 14. The film 23 is somewhat wider than would be necessary just to cover the inside wall, so that in the closed and filled casting mold 11, 12 the edges of the lower film 22 and of the upper film 23 project outwardly to some extent between the two mold halves 11 and 12. The films 22, 23 which are in fact somewhat too wide, ensure that the inside wall of the casting mold is always completely covered even when there are slight horizontal variations in the movement of the films. The film sections situated between the upper edge of the lower mold half 11 and the underside of the cover plate 15, also serve to seal off the casting mold when the latter is closed. It should be noted that the upper and the lower mold halves 11, 12 have no end walls and are thus in themselves open at their ends.

At a very short distance behind the casting mold 11, 12 (i.e., to the left of the casting mold in FIG. 1) a V-shaped guide trough 27 is secured to the frame 10 by means of supports 29. At the end nearest to the casting mold the trough 27 is open, but at the other end the trough 27 is closed by an end plate 28. The shape and arrangement of the trough 27 are such that a pipe jacket cast and hardened in the casting mold can be pushed from the mold into the trough 27, the pipe jacket being supported in the trough 27 at the same height as in the casting mold 11, 12. The length of the trough 27 can be chosen according to requirements, and will normally be several times the length of the casting mold, for example about three times. At a distance from the end plate 28 equal to the ultimately required length of the insulation pipe jacket (as will be explained later the ultimately required length need not be equal to that of the casting mold) the trough 27 is interrupted over some millimeters. This interruption 33 which extends over the entire height of the trough serves as a guide slot for a saw by means of which the insulation pipe jacket in the trough can be cut at this place.

The apparatus is used in the following manner. Let it be assumed that the closed casting mold still contains an insulation pipe jacket just produced therein, and that now a further insulation pipe jacket is to be produced. The upper mold half 12 is still positioned on top of the lower mold half 11, and the position of the pressure arms 18 is as shown in FIG. 2.

First of all, the cylinders 17 are now operated in such a manner that the pistons of these cylinders move outwards, so that the pressure arms 18 simultaneously disengage from the blocks 21 of the cover plate 15 and move laterally outwards from the upper mold half 12. The cover plate 15 can then be moved vertically upwards for a short distance without hitting the arms 18. However, when the arms 18 are moved away, the upper mold half 12 still remains in contact with the lower mold half 11; the vertical cylinders 16 are operated only after the arms 18 have been turned to the side, by which operation the pistons in these cylinders move upwards, lifting the upper mold half 12 from the lower mold half 11, and releasing it from the produced insulation pipe jacket which remains in the lower mold half 11. The casting mold is now open and accessible so that the insulation pipe jacket lying in the mold can be axially pushed out of the lower mold half 11 into the trough 27.

Figure 4:
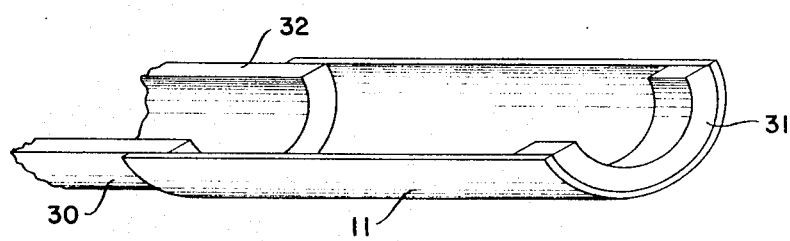
FIG. 4 is a perspective view of the lower mold half used in the apparatus of FIG. 1, with sealing plugs placed in this mold.
Figure 5:
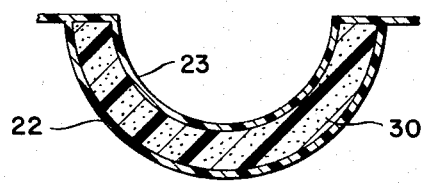
FIG. 5 is a cross-sectional view of a produced insulation pipe jacket sheathed in films.

The insulation pipe jacket, however, is not pushed out of the lower mold half 11 over its entire length; instead the rear end thereof remains behind in the lower mold 11, for example over a length of a few centimeters. This situation is illustrated in FIG. 4, which shows that the rear end 32 of the insulation pipe jacket 30, which has just been produced in the mold, is still in the lower mold half 11. This rear end 32 of the insulation pipe jacket remains in the mold in order to seal off the casting mold 11, 12 at the side of the trough 27 when the following insulation pipe jacket is being cast, and thus serves as a temporary sealing plug for the casting mold. Although for the sake of clarity the films 22 and 23 have been omitted in FIG. 4, these films are in reality connected to the surface of the already formed pipe jacket 30, i.e., film 22 to the convex under side, and film 23 to the concave upper side and the flat sides of the pipe jacket 30. This position of the films 22, 23 on the pipe jacket 30 is illustrated in FIG. 5, but it should be understood that the films 22, 23 have been illustrated as being separate from the pipe jacket 30 only for ease of reference; in reality they lie tightly against the surface of the pipe jacket, while the edges of the films 22, 23 lie against each other and are directed outwards to some extent. Since the films 22, 23 are firmly held by the surface of the pipe jacket 30, largely by means of the adhesion caused by static electricity in the films, the continuous films 22, 23 are also drawn through from the rolls 24, 25 when the pipe jacket 30 is pushed out of the lower mold half 11 into the trough 27, so that new sections of the films 22, 23 arrive between the two mold halves 11, 12. At this moment a plug 31 having a similar cross-section and composition as the foamed polyurethane jacket 30 is placed in the open end of the lower mold half 11 facing the rolls 24, 25. As is the case with the plug 32 at the other end of the lower mold half 11, the plug 31 is fairly short and has a length of only a few centimeters. The plug 31 is placed in the lower mold half 11 between the two films 22, 23 so that the film 22 is clamped between the plug 31 and the lower mold half 11, while film 23 passes over the plug 31. If necessary, the two films 22, 23 are drawn smooth and tight before or after the plug 31 is placed in the mold half 11. The casting mold is now ready to receive the composition used to make the foamed polyurethane, which composition is now injected by means of an injection device between the two films 22, 23 in the lower mold half 11 at a point between the two plugs 31, 32. As soon as the lower mold half 11 has received a certain amount of the liquid polyurethane mixture the mold is closed. This is effected by pressing the cover plate 15 downwards against the lower mold half 11 by means of the cylinders 16, whereupon the cover 15 is locked on the lower mold half 11 by the pressure arms 18, which are drawn inwards by the cylinders 17 until the bases 20 clamp rigidly against the blocks 21 of the cover plate 15. In the closed mold 11, 12 the casting mass reacts, and a few seconds later the mass foams up so that the originally only partly filled mold cavity is completely filled up. As a result of the relatively high pressure in the mold, which pressure is caused by the foaming of the polyurethane mass, the films 22, 23 in the mold are pressed against the entire inner wall of the mold, with the possible consequency that the films are somewhat stretched at some points; this is, however, not a drawback. Once the polyurethane foam in the mold has hardened sufficiently for the article to have acquired a permanent shape, the upper mold half 12 can be lifted from the lower mold half 11 in the manner already described, whereupon the cycle can be repeated for the production of further pipe jackets.

It has been found that the plugs 31, 32 unite with the cast pipe jackets to form one continuous whole. Since the cross-section and composition of the plugs are identical to those of the pipe jackets the plugs are hardly or not at all discernable in the finished pipe jacket.

The former plug 31 now constitutes the rear end of the new pipe jacket, so that when this jacket is pushed out of the mold into the trough 27, this former plug 31 serves as plug 32 when the following pipe jacket is produced in the mold.

While new pipe jackets are being produced in the mold the pipe jackets already molded which are still in the trough 27 have the opportunity of further hardening, should this be necessary. In general the pipe jackets will not have hardened completely when they leave the mold, since the residence time in the mold is shortened by removing the pipe jacket from the mold as soon as the polyurethane foam has hardened sufficiently for the pipe jacket to retain the form it has been given. When the front end of the continuous pipe jacket series in the trough 27 comes into contact with the end plate 28 of the trough 27, a saw is moved through the guide 29, so that the portion of the pipe jacket between the end plate 28 and the saw slot 33 is sawn apart from the other portion of the pipe jacket in the trough, whereupon this first pipe jacket is removed from the trough as finished insulation pipe jacket. If necessary the portions of the films 22, 23 which are still retained by this pipe jacket are stripped off and removed.

When the series of pipe jackets in the trough is again drawn through to the end plate 28 a following pipe jacket can be sawn off. If the length of the trough 27 between the saw slot 33 and the end plate 28 is equal to the length of the casting mold minus the length of the loose plug 31, the rear end of the pipe jacket series will automatically reach the appropriate place at the end of the lower mold half 11, so as to permit casting the following pipe jacket (viz at the place occupied by plug 32 in FIG. 4), whenever the series of pipe jackets in the trough is drawn through to the end plate 28 after the casting mold has been opened.

It will, however, be clear that the length of the finished pipe jacket is essentially independent of the length of the casting mold, and it is possible to produce pipe jackets which are twice or several times the length of the casting mold by continually adding new sections to the series of pipe jackets already in the trough. In other words, it is possible to have the length of the casting mold smaller than the required length of the insulation pipe jackets, for example, in order to ensure that the compressive forces occurring in the mold during foaming of the casting mass—which forces, in the case of large pipe jackets particularly, can amount to many thousand or tens of thousands of kilograms—are limited so that the construction can be given a much lighter design.

The axial removal of the pipe jackets from the casting mold greatly facilitates operations and permits a simplified design of the installation, and for this reason the method is suitable for use as a continuous and fully or semi-automatic process. The entire cycle for the production of the pipe jackets can be carried out and controlled, for example, pneumatically; it being possible to preset exactly the times for the various steps such as injection of the casting mass and opening and closing of the casting mold.

An important advantage of the method described is that the films 22, 23 are only bent cylindrically in the casting mold, and do not therefore have to be locally folded or creased as is necessary in the case of molds which have end faces.

The simplest method of producing the plugs 31 is to saw a pre-formed insulation pipe jacket into short pieces of for example 5 cm. The jacket which has been sawn into pieces does not constitute a loss since these pieces used as plugs 31 will be used again in the new pipe jackets.

The plugs 31 and 32 are so strongly clamped between the upper mold half 12 and the lower mold half 11 when the casting mold is closed that these plugs can resist the compressive forces in the mold which occur during foaming. If the plugs are pressed out of the mold during foaming they can be made a little longer, but in general a length of only a few centimeters is sufficient. If desired, the frictional resistance of the extremities of the casting mold 11, 12, in which the plugs are placed, can be increased by roughening somewhat the surface of the mold 11, 12 locally, or by providing it with a rough lining, for example a strip of abrasive paper. On the other hand the plugs can also serve as safety plugs, i.e., they can be given a length such that if the pressure in the mold should rise sharply, as, for example, as a result of an excessive amount of casting mass being accidentally supplied, any damage to the mold or to the mold sealing mechanism will be prevented by the plugs being pressed outwards from the mold. The plug length required for this purpose is most conveniently determined experimentally in each individual case.

The parts of the insulation pipe jacket, which come into contact with the lower and upper mold halves of the casting mold acquire a smooth, hard and strong crust of unfoamed polyurethane. The quantities and proportions of the components of the casting mass in the mold can be so chosen that the crust is sufficiently impermeable and strong to render superfluous the use of aluminum cover plates or other separate protective plates, which are necessary with the conventional insulation pipe jackets made of cork or glass wool.

The use of the invention is, of course, by no means limited to insulation pipe jackets, but can equally well be used for other articles. Amongst these other possibilities particular mention may be made of the manufacture of plates having a rectangular cross-section or the manufacture of sandwich panels. In this latter case, the foamed polyurethane layer forms the core or intermediate layer while the films 22, 23 referred to in the example can be replaced by thicker covering layers or fabric webs, which remain permanently united with the polyurethane layer.

The invention claimed is:

1. A method of forming foamed insulating jackets in a mold, said jackets having a length greater than the length of the forming mold which comprises:
 (1) sealing off the open ends of a mold with plugs of prefoamed materials selected from the group consisting of polyurethanes, polyepoxides, polyesters, polyethers, polycarbonates and polystyrenes;
 (2) injecting a predetermined amount of a foamable composition selected from the group consisting of polyurethanes, polyepoxides, polyesters, polyethers, polycarbonates and polystyrenes into said mold, causing said composition to foam and expand to unite with the plugs;
 (3) advancing the foamed article axially in said mold so that the terminal end thereof serves as a sealing plug to seal off the one end of the mold;
 (4) sealing off the other end of the mold with a plug of prefoamed material; and
 (5) repeating steps 2 through 4 as many times as required to produce a foamed article of a preselected length, said plugs and foamable composition consisting of the same material.

2. A method as in claim 1 wherein a sheet of polyethylene film is positioned between the plugs and the inside wall of the mold.

3. A method as in claim 2 wherein the sheet of polyethylene film is introduced as a continuous strip from outside the mold into the mold.

4. A method as in claim 3 wherein the continuous strip of polyethylene film adheres to outside portion of the foamed article and is drawn through simultaneously with the advancing foamed article.

References Cited

UNITED STATES PATENTS

| | | | |
|---|---|---|---|
| 2,857,931 | 10/1958 | Lawton | 264—45 X |
| 3,354,244 | 11/1967 | Davidson | 264—47 X |
| 3,359,351 | 12/1967 | Bender | 264—45 |
| 3,366,718 | 1/1968 | Komada | 264—45 |
| 3,429,956 | 2/1969 | Porter | 264—47 |

FOREIGN PATENTS 965,185   7/1964   Great Britain.

JULIUS FROME, Primary Examiner

P. A. LEIPOLD, Assistant Examiner

U.S. Cl. X.R.

18—4, 5; 264—46, 47